United States Patent [19]

Stana et al.

[11] 4,206,049
[45] Jun. 3, 1980

[54] RECOVERY OF URANIUM BY A REVERSE OSMOSIS PROCESS

[75] Inventors: Regis R. Stana, Murrysville; James G. Cleary, Pittsburgh, both of Pa.

[73] Assignee: Westinghouse Electric Corp., Pittsburgh, Pa.

[21] Appl. No.: 933,333

[22] Filed: Aug. 14, 1978

[51] Int. Cl.² .................. B01D 13/00; C01G 43/00
[52] U.S. Cl. ........................ 210/22 R; 210/23 H; 210/73 R; 423/3; 423/11; 423/18
[58] Field of Search .................. 423/10, 3, 11, 18; 210/23 H, 23 F, 22, 42 R, 73 R, 321 R

[56] References Cited

U.S. PATENT DOCUMENTS

| | | | |
|---|---|---|---|
| 2,769,686 | 11/1956 | McCullough | 423/10 |
| 2,859,092 | 11/1958 | Bailes et al. | 23/14.5 |
| 3,175,879 | 3/1965 | Townend et al. | 423/11 |
| 3,341,303 | 9/1967 | Berri et al. | 423/10 |
| 3,593,855 | 7/1971 | Stana | 210/500 |
| 3,630,378 | 12/1971 | Bauman | 210/257 |
| 3,744,642 | 7/1973 | Scala et al. | 210/500 |
| 3,795,609 | 3/1974 | Hill et al. | 210/23 |
| 3,835,207 | 9/1974 | Frost et al. | 264/41 |
| 3,835,214 | 9/1974 | Hurst et al. | 423/10 |
| 3,956,141 | 5/1976 | Becker et al. | 423/19 |
| 4,002,716 | 1/1977 | Sundar | 423/10 |

OTHER PUBLICATIONS

"R.O. Performance of Cellulose Acetate Memb. in the Sep. of Uranium . . . ", Sastri et al, Separation Science, p. 361–376, 1976.
"Membrane Ultrafiltration" Porter et al, Chemical Tech., Jan. 1971.

Primary Examiner—Charles N. Hart
Assistant Examiner—David Sadowski
Attorney, Agent, or Firm—D. P. Cillo

[57] ABSTRACT

A method for concentrating and recovering uranium material from an aqueous solution, comprises passing a feed solution containing uranium through at least one reverse osmosis membrane system to concentrate the uranium, and then flushing the concentrated uranium solution with water in a reverse osmosis membrane system to further concentrate the uranium.

7 Claims, 1 Drawing Figure

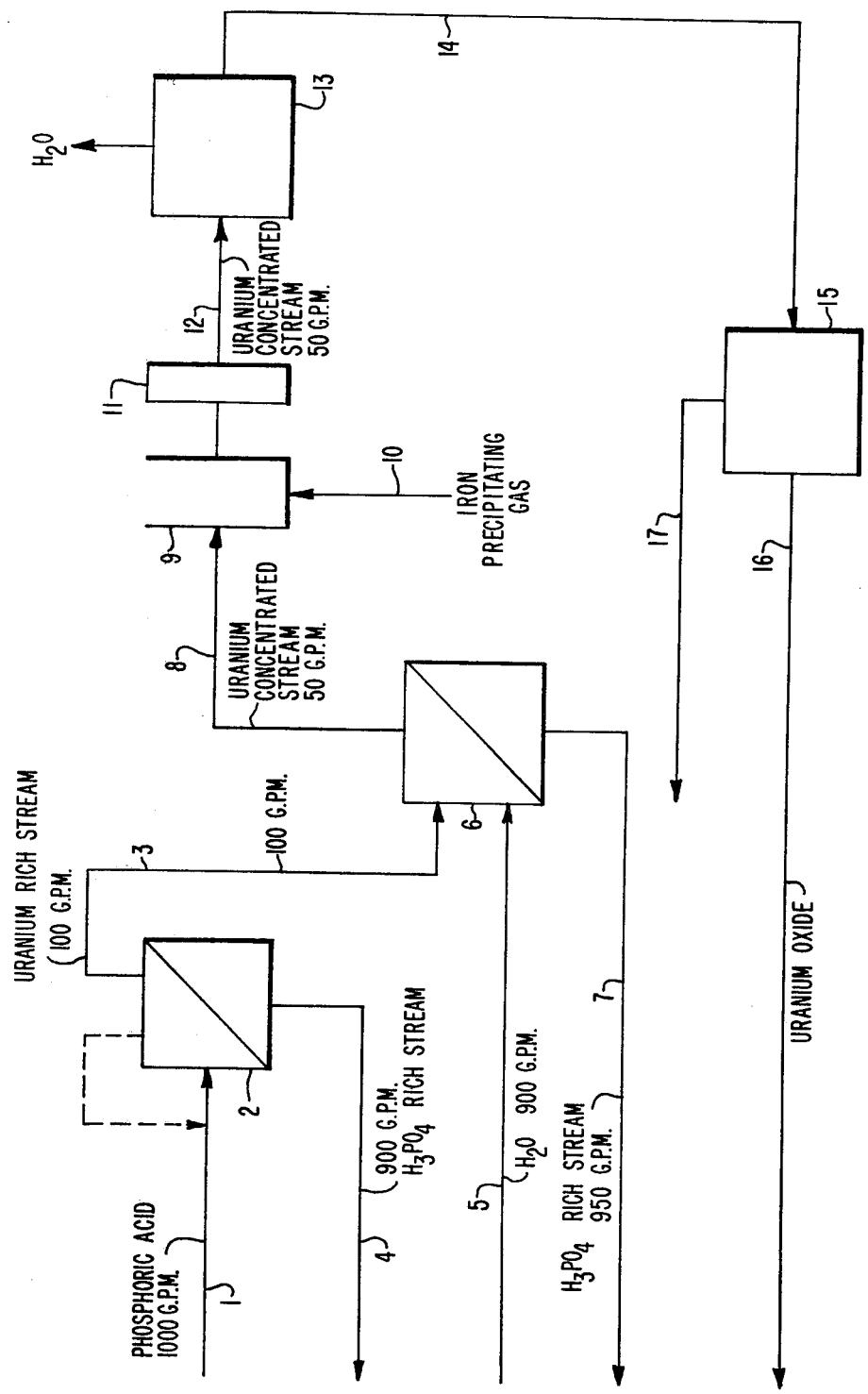

RECOVERY OF URANIUM BY A REVERSE OSMOSIS PROCESS

BACKGROUND OF THE INVENTION

Solvent extraction processes for the recovery of metals, and particularly uranium, from aqueous solutions, such as crude, industrial phosphoric acid solutions, produced from phosphate rock, are well known, and are taught, for example by Bailes and Long, in U.S. Pat. No. 2,859,092. Such processes comprise using various chemicals, such as alkyl phosphoric, alkyl phosphonic, or alkyl phosphitic acids, among others, to extract the uranium from the phosphoric acid.

After the uranium is recovered from the acid, the acid is returned to the acid producer for further processing, to make, for example, various types of fertilizer. However, the chemicals used in the solvent extraction process may interfere with further processing, and must be removed, increasing both the complexity and cost of the uranium recovery process.

Reverse osmosis processes are well known as means for purifying sea or waste water solutions, containing from about 100 to 5,000 parts, per million parts water, of salt or other dissolved solids, as taught by Stana, in U.S. Pat. No. 3,593,855. Reverse osmosis has also been used to remove dissolved minerals, such as iron, calcium, magnesium, manganese, and aluminum from sulfate containing, contaminated, acid mine drain waters, which have generally been pretreated by chlorination and ferrous iron oxidation, as taught by Hill et al., in U.S. Pat. No. 3,795,609.

In the Hill et al. process, a single reverse osmosis step is used. The concentrated acidic metal containing stream is then neutralized, from a pH of about 1.5 to a pH of 4.5, by addition of large quantities of lime, to form a precipitate of iron, aluminum and sulfate. This is then followed by ferrous-to-ferric oxidation, as by aeration. A final clarification step follows, to remove the concentrated sludge from the neutralized solution, which solution is recycled into the mine acid feed.

Sastri and Ashbrook, in *Separation Science*, 11(4), pp. 361–376, 1961, describe the use of single step reverse osmosis as the sole means to remove uranyl sulfate, $UO_2SO_4$, from mine water feed. The metal ions separated are $Ca^{+2}$, $Fe^{+3}$, $Al^{+3}$ and $U^{+6}$, using supported, preshrunk, "tight", cellulose acetate permselective membranes, having rejection rates of between about 50% to 90% on aqueous NaCl. Such a system would have a very low purified material flux.

What is needed is a commercially feasible process, specifically adapted to concentrate the small amounts of uranium in the natural valence state, present in wet process phosphoric acid (WPA) and other type solutions. This process should not require expensive neutralization of the acid, or the addition of any chemicals that will interfere with the further processing of the crude acid solution. Ideally, and importantly, this process should also provide a phosphate solution substantially free of iron and organic impurities.

SUMMARY OF THE INVENTION

The above-described need is met by using a combination reverse osmosis process. A first reverse osmosis system, containing at least one supported permselective membrane, is used to concentrate uranium in the solution, such as phosphoric acid solution (30% as $P_2O_5$), and pass a substantial part of the phosphoric acid, without the addition of any chemicals to the acid stream. The concentrated uranium solution stream, still containing phosphoric acid, is further concentrated by a water flushing step, in which water is added to the concentrated uranium solution in a reverse osmosis system, to further concentrate uranium and pass substantially all of the phosphoric acid as pure, dilute solution.

Iron, in the further concentrated, phosphoric acid lean, uranium rich solution stream, is then preferably removed, after precipitation involving contact with a suitable gas, such as hydrogen sulfide gas, without the use of neutralizing lime or limestone. Finally, the organic impurities are preferably removed by drying the concentrate, and heating or burning the uranium-organic solids in an ignition means, such as a muffle furnace, in the presence of oxygen, at a temperature and for a time effective to remove the organics, yielding a material containing uranium oxide. This method not only recovers a substantial amount of uranium, but removes significant quantities of impurities from the phosphoric acid, greatly increasing its resale value to the acid manufacturer. The acid resale is important in increasing the commercial potential of this method.

BRIEF DESCRIPTION OF THE DRAWING

For a better understanding of the invention, reference may be made to the preferred embodiment exemplary of the invention shown in the accompanying drawing, which is a flow diagram describing one embodiment of a proposed commercial operation using the method of this invention, for recovery of uranium and removal of iron and organic impurities from acid phosphate solutions.

DESCRIPTION OF THE PREFERRED EMBODIMENTS

The basic concept of the present invention is to concentrate uranium in either or both the $U^{+4}$ and $U^{+6}$ state, from an aqueous solution, such as phosphoric acid, $H_3PO_4$, by a combination reverse osmosis process, without the addition of any chemicals, and to also optionally concentrate iron and organic impurities.

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis", "pressure osmosis" and "hyperfiltration" are used to describe this process.

In a typical reverse osmosis system of the tubular type, the contaminated fluid is pumped through a battery of connected tubes. There can be as many as 150 tubes in each battery. The tubes serve to support a reverse osmosis or ultrafiltration membrane contacting the inside surface of the tube wall. The tube can be made of a variety of materials such as porous fiberglass, stiff filter paper, wire mesh, perforated stainless steel, or resin bonded filler particle tubes, such as porous, molded, phenolic, melamine, epoxy or polyester resin coated sand tubes.

The tube walls or other support for the reverse osmosis or ultrafiltration membranes, must be able to withstand the pressure exerted on them by the pumping means used to circulate the contaminated fluid, and must be able to allow egress of the purified fluid into a suitable collecting means. Of course, other configurations, such as flat plate, spiral wound and hollow fine fiber type reverse osmosis modules, which are well known in the art, can also be used in the reverse osmosis system used in this invention. In the method of this invention, at least one pass through a reverse osmosis system and then passage through a reverse osmosis water rinse system is required in order to effectively concentrate the uranium and provide a $H_3PO_4$ rich stream.

A wide variety of semipermeable, i.e., permselective reverse osmosis or ultrafiltration membranes may be used in the reverse osmosis systems used in the method of this invention. U.S. Pat. Nos. 3,593,855; 3,835,207; and 3,744,642, herein incorporated by reference, describe respectively, typical, modified cellulose acetate type semipermeable membranes; polyamic acid salt permselective membranes having a high concentration of hydrophilic carboxylate salt groups; and polyamide, polyphenylester, polysulfone and polysulfonamide filtration membranes, all of which are useful in the method of this invention. The semipermeable membranes useful in the reverse osmosis systems of this invention are those having from about 7.5% to 40%, preferably 20% to 40%, NaCl rejection at about 300 psi., with about 2,000 ppm (parts per million water) NaCl as impurity, i.e. a "loose" membrane. These "loose" membranes, i.e., about 35% NaCl rejection will provide approximtely 10 times the purified material flux rate than a "tight" membrane of about 75% NaCl rejection. The term "% rejection" will herein mean % NaCl rejection at 300 psi in 2,000 ppm concentration.

Wet crude phosphoric acid is made by a process involving phosphate rock reaction with sulfuric acid and oxidation, generally by nitric acid. This process dissolves considerable amounts of various compounds from phosphate rock, which remain as soluble impurities and humus in the commercial wet process phosphoric acid. The humus, including decayed organic material, will react with the acid to form organic humic acids. The phosphoric acid product is known as "black" or "brown" acid.

Referring now to the drawing an aqueous solution, such as crude, brown, industrial, wet process phosphoric acid solution 1, containing small amounts of iron and organic impurities, is fed into a first reverse osmosis system 2, containing at least one supported semipermeable membrane of about 7.5% to 40% NaCl rejection, capable of concentrating uranium in the natural valence state, usually $U^{+4}$ and/or $U^{+6}$. The brown, wet process phosphoric acid solution, typically a 30 wt.% $P_2O_5$ solution, will contain about 600 grams/liter of phosphate, about 150 grams/liter of sulfate, about 9 grams/liter of iron, and about 0.1 to 0.2 gram/liter, i.e., about 0.82 to 1.65 pounds/1000 gallons, of uranium. This phosphoric acid solution will also include various organic impurities such as about 1 to 10 grams/liter of decayed organic material, organic humic acids, and sludge forming contaminants.

In a typical commercial run, using the method of this invention, the phosphoric acid feed is separated by the reverse osmosis system 2 into a U rich stream 3 still containing some phosphoric acid solution, and a U lean phosphoric acid rich stream 4. In this step a substantial portion of the phosphoric acid is passed through the membrane, i.e., removed from the uranium concentrate stream. In some instances, the uranium rich stream may be recycled into the feed stream to concentrate additional uranium, as shown by the broken line in the drawing. If the feed 1 contains about 1.65 lb. of $U^{+4}$/1,000 gal., the uranium rich stream 3 will contain about 15.8 lb. of $U^{+4}$/1,000 gal., and the uranium lean stream 4 will contain about 0.1 lb. of $U^{+4}$/1,000 gal.

A continuous water rinse stream 5, along with the uranium rich stream 3, is fed into the same reverse osmosis system, used as a water rinse system or preferably into a similar second reverse osmosis water rinse system 6, containing at least one supported semipermeable membrane of about 7.5% to 40% rejection; capable of concentrating uranium. The dual reverse osmosis steps are essential to this method. The volume rate of water:uranium concentrate in the rinse system must be between about 15:1 to 5:1, in order to effectively pass, flush out and recover substantially all of the remaining phosphoric acid as dilute solution, which will be substantially free of iron and organic impurities, and thus useful for further processing and resale. In this continuous water addition flushing step, uranium rich stream 3 still containing some phosphoric acid will be separated into a phosphoric acid rich stream 7, containing 3.15% $P_2O_5$, and a $P_2O_5$ lean, uranium concentrate solution stream 8, containing about 0.003% $P_2O_5$ and about 30 lb. of U/1000 gal.

The uranium concentrate solution stream 8 may then preferably be passed through a precipitation means or tank 9, where it is contacted with a suitable gas 10 effective to precipitate iron in the form of iron sulfide, without the use of neutralization chemicals. Preferably, $H_2S$ gas is bubbled through the precipitation tank. A filter means 11 is then generally used to collect and remove the iron precipitate from the stream. Useful filters include fibrous paper, vacuum drum filters, pressure leaf filters and the like.

The uranium concentrate, iron lean stream 12, may then preferably be evaporated to dryness, as by boiling it in a suitable container in an oven, processing it through a spray dryer, passing it through a recycle flash evaporator, or by any other suitable drying means 13. The uranium concentrate dry solids 14, which after drying would contain between about 2 wt.% to 10 wt.% water, may preferably be fed to a heating, ignition means 15, such as into a muffle furnace, or through a hollow flight screw conveyor calciner, at about 700° C. to 950° C., in an oxygen environment, such as air, to ignite and remove substantially all, i.e., about 90% to 95%, of the organics and volatiles as vapor 15, containing mostly $CO_2$ and $H_2O$. This will yield about 50% to 95% of a uranium oxide containing material 16, primarily in the form of $U_3O_8$. In some instances, the optional drying and ignition steps can be combined.

Assuming a flux rate of about 3 G.S.F.D. (gallons/square foot/day) for the first reverse osmosis system 2, and 10 G.S.F.D. for the second reverse osmosis system, since the viscosity of the feed will be lower because of water addition, a total membrane area of about 565,000 square feet would be necessary for a plant processing phosphoric acid at a rate of 1,000 G.P.M. (gallons/minute). Since the pH of the phosphoric acid solution is very low, cellulose acetate membrane would be expected to have a useful life of only about 2 to 3 weeks. Other membranes, however, such as polysulfone membranes, which are very stable at low pH values, could easily have a useful life in excess of 3 years.

EXAMPLE 1

Phosphoric acid feed solution (30 wt.% as $P_2O_5$) was fed through four supported cellulose acetate membranes, comprising a reverse osmosis system. The phosphoric acid solution contained about 600 grams per liter of phosphate, 50 grams per liter of sulfate, 9 grams per liter of iron and 0.2 grams per liter of uranium as $U^{+4}$, i.e., about 1.66 pounds of uranium per 1,000 gallons of feed. The phosphoric acid feed solution also contained about 3 grams per liter of organic impurities, including decayed organic material, organic humic acids and sludge forming contaminants.

The cellulose acetate membranes were relatively "loose", capable of rejecting 30.5% NaCl at a flux rate of 44.2 gallons per square foot per day (G.S.F.D.) at 300 psi. for a salt solution containing 2,000 parts per million (ppm.) of NaCl. Twenty gallons of phosphoric acid feed solution was fed into the reverse osmosis system under about 400 psi. pressure, at a rate of 1 gallon per minute. The uranium lean, phosphoric acid rich stream rate was about 12 milliliters per minute. The cellulose acetate membrane surface area for the reverse osmosis system was only about 2 square feet, providing a ratio of membrane area to feed rate of 2 sq. ft./G.P.M.

This low ratio required continuous recycling of the rejected, uranium rich stream through the reverse osmosis system, until only two gallons of uranium rich stream remained. In a large commercial operation, the ratio of membrane area to feed rate would be about 550 sq. ft./G.P.M., so that recycling might not be necessary. At the end of this stage, the cellulose acetate membranes rejected about 91% of the uranium and about 95% of the total carbon, at a flux rate of 3.2 G.S.F.D. and still contained some phosphoric acid. The membranes were supported by the inside surface of four cured, tubular, phenolic resin coated sand modules, which were connected together. The sand modules were in turn contained within thin stainless steel tubes.

The uranium rich stream was then flushed with water, in the same reverse osmosis system, in a ratio of about 1 gallon of concentrate to 9 gallons of water, to pass and recover substantially all of the remaining phosphoric acid, as uncontaminated dilute solution. The flux through the reverse osmosis system in this instance was about 10 G.S.F.D. The further uranium concentrated stream, containing uranium, iron and organic impurities, was then fed through a tank. The tank had $H_2S$ gas, from a sparge stone, bubbling through the uranium concentrate, causing precipitation of iron sulfide. No neutralization chemicals were used.

The uranium concentrated stream, containing the precipitate, was then fed through a filter paper filter, to remove the iron sulfide. The uranium concentrated, iron lean stream, still containing organic impurities, was then collected in a tank and boiled to remove liquid. The remaining solids were placed in a crucible and heated in a muffle furnace, in air, at 800° C., for 2 hours, to ignite and vaporize substantially all, i.e., about 90% to 95%, of the organic impurities originally present in the feed, leaving a material containing about 90% $U_3O_8$.

EXAMPLE 2

Phosphoric acid feed solution (30 wt% as $P_2O_5$) was fed through reverse osmosis systems, an iron precipitation tank, and a filtering system, followed by evaporation and ignition of the solids to yield about 50% $U_3O_8$, using the same method, flow rates and apparatus as in Example 1; except that a more "open", polysulfone ultra filtration, semipermeable membrane was used in place of a cellulose acetate membrane.

In this example, the polysulfone membrane was capable of rejecting 9.2% NaCl at a flux rate of 39.8 G.S.F.D. at 300 psi., for a salt solution containing 2,000 ppm. of NaCl. After recycling, these membranes rejected about 50% uranium and about 67% total carbon, at a flux rate of 9.2 G.S.F.D.

We claim:

1. A method for continuously recovering uranium material from a phosphoric acid solution, comprising the steps of:
    (A) passing a phosphoric acid solution, containing phosphoric acid, uranium, iron, and organic impurities, through at least one first reverse osmosis separation system, containing at least one semipermeable membrane capable of concentrating uranium, to concentrate uranium and pass a substantial portion of the phosphoric acid, and to provide a uranium concentrate stream, containing phosphoric acid, uranium, iron and organic impurities; and then,
    (B) adding water to the uranium concentrate solution stream, to provide a volume ratio of water:uranium concentrate of between about 15:1 to about 5:1, in a water rinse second reverse osmosis system, containing at least one semipermeable membrane capable of concentrating uranium, to pass substantially all of the phosphoric acid, and to provide a further uranium concentrated solution stream, containing uranium, iron, and organic impurities, and then,
    (C) passing the further uranium concentrated solution stream through a precipitation means, where the stream is contacted with a gas effective to precipitate iron, without the addiition of neutralization chemicals, and then,
    (D) removing the iron precipitate, and then,
    (E) heating the organic impurity containing uranium concentrate, in the presence of oxygen, at a temperature and for a time effective to remove substantially all of the organic impurities, yielding a material containing uranium oxide; wherein the semipermeable membranes used in the separation system and the water rinse system are characterized as having a NaCl % rejection rate of between about 7.5% and 40%.

2. The method of claim 1 wherein the gas used in step (C) is $H_2S$, the iron is removed in step (D) by filtration, and the uranium concentrate is dried between steps (D) and (E).

3. The method of claim 1, wherein the semipermeable membrane used in the reverse osmosis system has an NaCl rejection rate of between about 20% and 40%.

4. The method of claim 1, wherein the uranium concentrate is heated, in step (E), at between about 700° C. to about 900° C.

5. The method of claim 1, wherein the phosphoric acid solution is wet process phosphoric acid containing about 600 grams/liter of phosphate, about 9 grams/liter of iron, between about 1 to 10 grams/liter of organic impurities and about 0.1 to 0.2 gram/liter of uranium as U$^{+4}$.

6. The method of claim 1, wherein the semipermeable membrane used in the reverse osmosis systems is selected from the group consisting of cellulose acetate, polyamic acid salts, polyamide, polyphenylester, polysulfone and polysulfone amide.

7. The method of claim 1, wherein the uranium oxide yielded in step (E) comprise U$_3$O$_8$.

* * * * *